United States Patent [19]

Yoshida et al.

[11] 4,351,196
[45] Sep. 28, 1982

[54] MULTISTAGE CHANGE-SPEED APPARATUS FOR A TRACTOR

[75] Inventors: Jituo Yoshida, Izumi; Kazuo Toyokuni, Sakai, both of Japan

[73] Assignee: Kubota, Ltd., Osaka, Japan

[21] Appl. No.: 95,187

[22] Filed: Nov. 16, 1979

[30] Foreign Application Priority Data

Dec. 28, 1978 [JP] Japan .................. 53-179382[U]

[51] Int. Cl.³ .................. F16H 37/00; F16H 37/06
[52] U.S. Cl. .................. 74/15.4; 74/15.86; 74/720.5; 74/665 G
[58] Field of Search .................. 74/740, 15.4, 15.8, 74/15.84, 15.86, 665 F, 665 G, 665 GA, 665 R, 664, 325, 369, 720.5

[56] References Cited

U.S. PATENT DOCUMENTS

| Re. 23,213 | 3/1950 | Haefeli | 74/15.4 |
|---|---|---|---|
| 2,190,259 | 2/1940 | Custenborder | 74/15.4 X |
| 2,761,322 | 9/1956 | Ronan | 74/740 |
| 2,772,582 | 12/1956 | Gerst | 74/740 |
| 2,838,940 | 6/1958 | Swenson et al. | 74/740 |
| 3,733,912 | 5/1973 | Murayama et al. | 74/15.86 |
| 4,141,424 | 2/1979 | Murayama et al. | 74/15.4 X |
| 4,245,514 | 1/1981 | Miyahara et al. | 74/15.4 |

FOREIGN PATENT DOCUMENTS

| 1087009 | 8/1960 | Fed. Rep. of Germany | 74/15.4 |
|---|---|---|---|
| 1206146 | 2/1960 | France | 74/15.84 |
| 596922 | 6/1959 | Italy | 74/15.4 |
| 52-64729 | 5/1977 | Japan | 74/15.86 |
| 427471 | 4/1935 | United Kingdom | 74/328 |
| 602316 | 5/1948 | United Kingdom | 74/740 |

OTHER PUBLICATIONS

Merritt, H. E., *Gears*, Sir Isaac Pitman & Sons Ltd., London, 1958, pp. 1–5.

*Primary Examiner*—Leslie Braun
*Assistant Examiner*—Lawrence J. Gotts
*Attorney, Agent, or Firm*—Edwin E. Greigg

[57] ABSTRACT

A multistage change-speed apparatus for a tractor has a running-travel-system change-speed gearing apparatus, a planetary gearing reduction apparatus operatively connected to that apparatus, an intermediary transmission shaft driven by this apparatus, a speed-reduction shaft disposed beneath that shaft, a bevel pinion shaft disposed in parallel with this shaft, an auxiliary change-speed gearing apparatus disposed between these two shafts, and a differential operatively connected to that apparatus. The planetary gearing reduction apparatus is shiftable between the operative state and the inoperative state.

3 Claims, 3 Drawing Figures

MULTISTAGE CHANGE-SPEED APPARATUS FOR A TRACTOR

BACKGROUND OF THE INVENTION

This invention relates to a multistage change-speed apparatus for a tractor. Tractors are used for quite a variety of works, and their running-travel-system change-speed apparatuses are therefore normally constructed to be able to change the speed in multiple steps more in number than in the case of usual passenger cars. Particularly remarkable is in slow speed area where such low range of 0.2–1.0 km/hour is employed, and most of them are made for shifting the forward speed in more than ten steps in total. Change-speed apparatuses of such construction inevitably require the transmission casing of large dimensions, together with complicated structure encased therein.

It has thus been a problem in what construction the multiple-step speed changing as extends to the super-low speed may be performed in a compact structure.

It has been the conventional practice to construct the change-speed apparatus for a tractor of the said type, as comprises a running-travel-system change-speed gearing apparatus, namely a main change-speed gearing just corresponding to the normal change-speed apparatus of the usual car, and an auxiliary change-speed gearing apparatus for shifting the output speed in high and low two steps. As a result of practically leasible designing of the entire change-speed apparatus including the meshing gears, however, it has been inevitable that the change-speed range as may be provided by the main change-speed gearing when the auxiliary change-speed gearing is shifted in high and the change-speed range as may be provided by the main change-speed gearing when the auxiliary change-speed gearing is shifted in low, partly overlap one with the other, thus it has not been able to make effective use of the multiple-step change-speed coverage.

Furthermore, it has recently been required for the tractors of the said type to utilize low speed range yet slower than the conventional so called super-low speed, but there has been a limit to the feasible super-low speed, because of the limited practical design possibility of the gears in the main and auxiliary change-speed gearings.

There have thus conventionally been no multistage change-speed apparatuses for tractors, as may realize multiple-step speed changing as extends to the super-low speed, sufficiently avoiding useless overlapping of the change-speed ranges as may be provided by the main change-speed gearing when the auxiliary change-speed gearing is shifted in high and low, and as may yet be compactly made up in the entirety of the change-speed apparatus of small dimensions.

SUMMARY OF THE INVENTION

This invention has as its object to alleviate the drawbacks of the multistage change-speed apparatuses for tractors, of the prior art as mentioned hereinabove, and to provide a multistage change-speed apparatus for a tractor as may compactly be made up, yet sufficiently covering the super-low speed range.

The multistage change-speed apparatus for a tractor according to this invention is characterized in that it comprises:

a main running-travel-system change-speed gearing apparatus including input shaft and a first output shaft disposed above the said input shaft, an intermediary transmission shaft disposed to extend in extension of the said first output shaft to be coaxial therewith, a planetary gearing reduction apparatus disposed in between the said first output shaft and intermediary transmission shaft, to be shiftable between two states of which one is for transmission of the driving power with super-reduction of speed from the former shaft to the latter shaft and the other is for transmission without such reduction of speed, a smaller diameter gear fitted on the said intermediary transmission shaft, a speed-reduction shaft disposed beneath the said intermediary transmission shaft, a larger diameter gear fitted on the said speed-reduction shaft to be in mesh with the said smaller diameter gear, a bevel pinion shaft disposed in parallel with the said speed-reduction shaft, an auxiliary change-speed gearing apparatus disposed between the said speed-reduction shaft and bevel pinion shaft, and a differential operatively connected to the said bevel pinion shaft.

With the said reduction gears thus disposed between the planetary gearing reduction apparatus and the auxiliary change-speed gearing apparatus, it has been made possible to further widen the slow change-speed range in comparison with the conventional construction with power input to the auxiliary change-speed gearing apparatus directly from the planetary gearing reduction apparatus. It is hereby made possible to make effective use of the multiple-step change-speed coverage by selectively employing or not employing the super-reduction of speed by the planetary gearing reduction apparatus, enabling to optimally avoid the useless overlapping of the change-speed ranges as may be provided by the change-speed gearing apparatus when the auxiliary change-speed gearing apparatus is shifted in high and low, thus to satisfy the requirement for the change-speed apparatus for a tractor as is characterized by particularly frequent use of the super-reduction speed range.

Although it is as well conceivable, as a measure for such widening of the low speed range, to enlarge the conventional reduction gearing ratio in the power transmission from the planetary gearing reduction apparatus to the auxiliary change-speed gearing apparatus, more particularly to make realize larger reduction ratio only of the gearing for low speed out of the high and low two-step speed-change gearings of the auxiliary change-speed gearing apparatus; there is a limit to the practical design possibility with respect to the feasible reduction gearing ratio.

Contrary thereto, it has been made possible, by separately providing a speed-reduction shaft and reduction gears from the main and auxiliary change-speed gearing apparatus in accordance with this invention, to further reduce the speed in the low speed range of the auxiliary change-speed gearing apparatus without reducing any further the speed in the high speed range thereof, thus to widen the super-reduction range of speed.

Further to be noted is that it has been made possible to provide the multistage change-speed apparatus for covering such super-low speed simply by additionally incorporating the speed-reduction shaft and reduction gears between the said planetary gearing reduction apparatus and auxiliary change-speed gearing apparatus, without modifying the main change-speed apparatus.

Further objects of and advantages accruing from this invention will become apparent from the detailed description now to follow hereunder.

BRIEF DESCRIPTION OF THE DRAWINGS

The drawings show, by way of example, an embodiment of the multistage change-speed apparatus for a tractor according to this invention, wherein.

DETAILED DESCRIPTION OF THE PREFERRED EMBODIMENT

Figure 1:
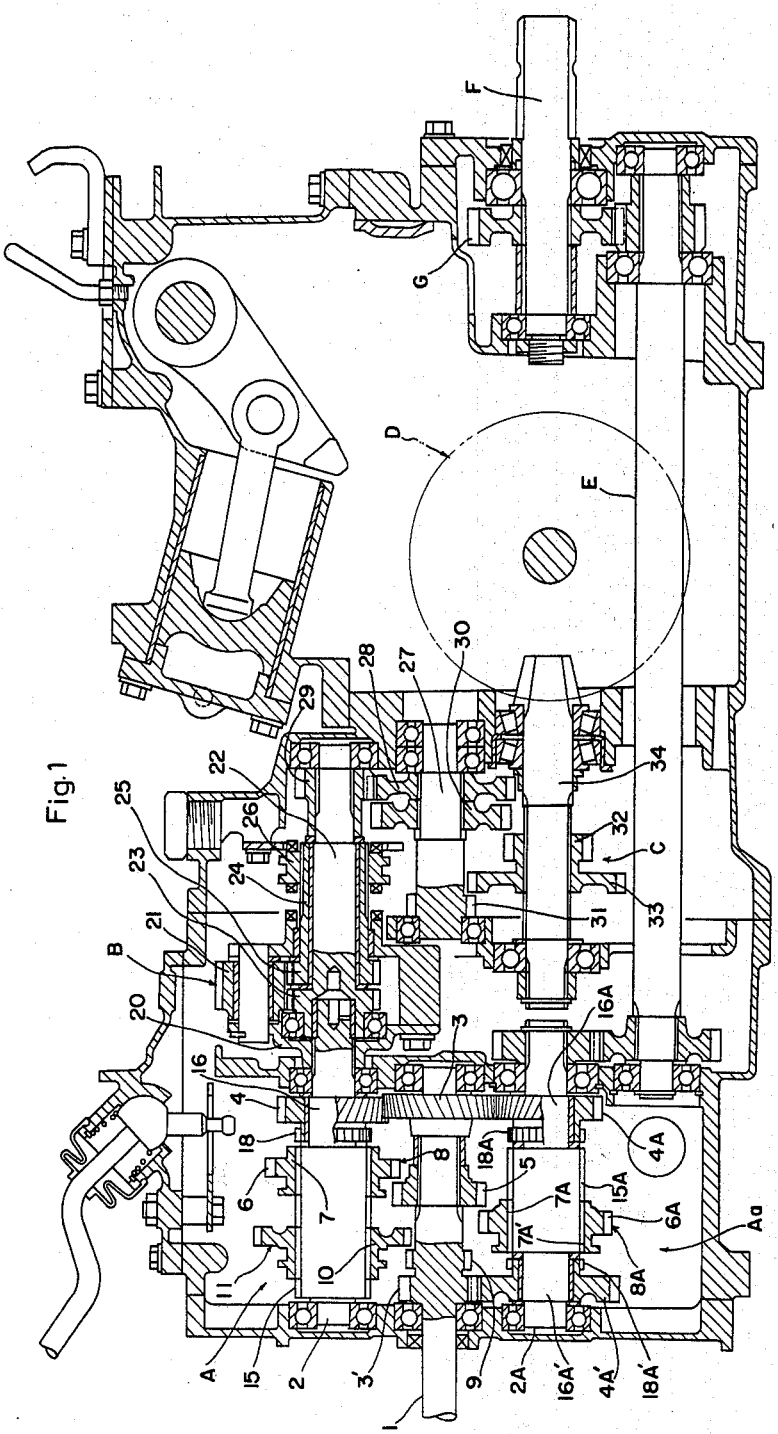
FIG. 1 is a side elevation of the tractor transmission mechanism in longitudinal section.
Figure 2:
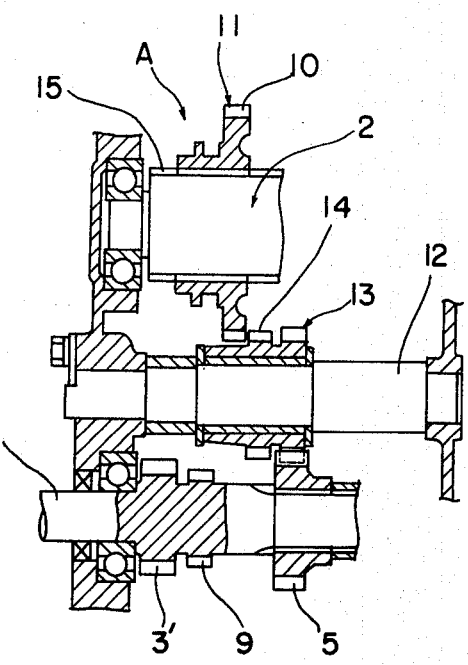
FIG. 2 is an enlarged side elevation of the transmission mechanism.
Figure 3:
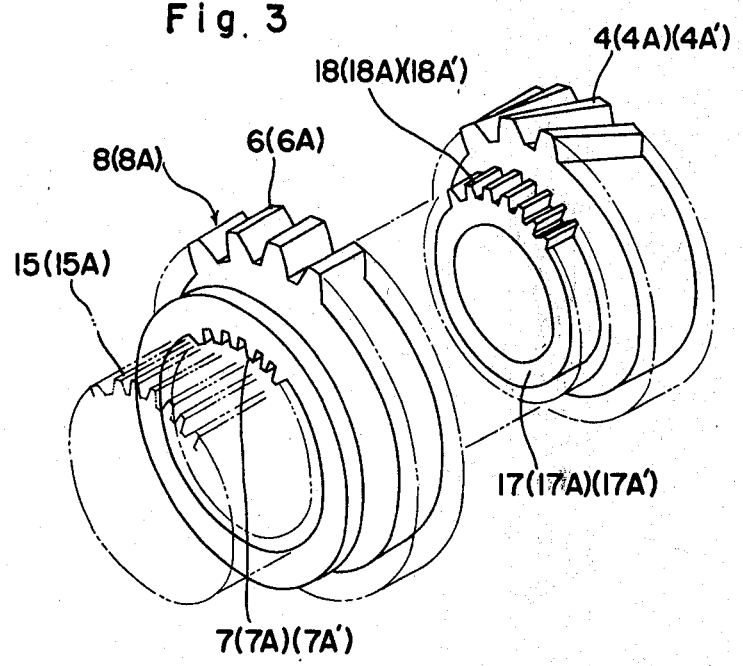
FIG. 3 is a perspective view of the gear parts provided in the transmission mechanism.

FIG. 1 shows a transmission mechanism of a tractor, with a running-trave-system change-speed gearing apparatus shiftable to select speed in forward three steps and rearward one step as designated at (A), a Harrison-type planetary gearing reduction apparatus shiftable between a state for transmission of the driving power with super-reduction of speed from that change-speed gearing apparatus (A) and another state for transmission without such reduction of speed as designated at (B), and an auxiliary change-speed gearing apparatus shiftable between the change-speed steps for high and low speeds in transmitting the driving power from that reduction apparatus (B) to a differential (D) operatively connected to running wheels, as designated at (C). There are further shown a power-take-off line change-speed gearing apparatus shiftable in three change-speed steps as designated at (Aa) with its input shaft (1) commonly functioning as such also for the said running-travel-system change-speed gearing apparatus (A), and a transmission shaft designated at (E) for transmitting the driving power from that change-speed gearing apparatus (Aa) to a power-take-off shaft (F) via a reduction gearing mechanism (G). FIG. 2 shows a speed-change gearing mechanism for rearward travel in the said running-travel-system change-speed gearing apparatus (A).

The said running-travel-system change-speed gearing apparatus (A) is constructed with: a helical gear (4) loosely fitted on an output shaft (2) for the super-reduction apparatus (B) extending parallel with the said input shaft (1), as engageable in meshing interconnection with a helical gear (3) for high speed transmission as securely fixed to the input shaft (1), in a state fixed in the axial direction at such a position that may always retain the meshing engagement; a first speed-shifter (8) having a spur gear (6) engageable in meshing interconnection wih a spur gear (5) for medium speed transmission as securely fixed to the input shaft (1) and an engagement lug (7) engageable in secure interconnection with the said loosely fitted helical gear (4), as splined on the said output shaft (2) for free sliding only in the axial direction with its position shiftable over a position for bringing only the spur gear (6) in the meshing interconnection, another position for bringing only the engagement lug (7) in the secure interconnection and still another position for bringing them (6),(7) both off their interconnection; and a second speed-shifter (11) having a spur gear (10) engageable in meshing interconnection with a spur gear (9) for low speed transmission as securely fixed to the input shaft (1), as splined on the said output shaft (2) for free sliding only in the axial direction with its position shiftable between a posiion for bringing the said spur gear (10) in the meshing interconnection and other positions for bringing same off the interconnection.

Thus, construction is provided to realize the neutral state of interrupting the transmission from the input shaft (1) to the output shaft (2) by sliding the speed-shifters (8), (11) both into their non-interconnecting position; to realize the high speed transmission state of transmitting a power from the input shaft (1) sequentially via the helical gear (3) for high speed transmission, the loosely fitted helical gear (4) and the first speed-shifter (8) to the output shaft (2) by sliding the first speed-shifter (8) into its secure interconnection position; to realize the medium-speed transmission state of transmitting a power from the input shaft (1) sequentially via the spur gear (5) for medium speed transmission and the first speed-shifter (8) to the output shaft (2) by sliding the first speed-shifter (8) into its meshing interconnection position; and to realize the low-speed transmission state of transmitting a power from the input shaft (1) sequentially via the spur gear (9) for low speed transmission and the second speed shifter (11) and the second speed-shifter (11) to the output shaft (2) by bringing the second speed-shifter (11) into its meshing interconnection position.

The speed-change gearing mechanism for rearward travel in the said running-travel change-speed gearing apparatus (A) is constructed with: an idle gear (13) loosely fitted on an intermediary shaft (12) extending parallel with the said input shaft (1) and output shaft (2), as engageable in meshing interconnection with the said spur gear (5) for medium speed transmission on the input shaft (1), in a state fixed in the axial direction at such a position that may always retain the meshing engagement; and a speed-reduction spur gear (14) annexedly incorporated in that idle gear (13) so that the spur gear (10) of the said second speed-shifter (11) may engage in meshing interconnection herewith by sliding movement of the second speed-shifter (11) into its third position different from both of its two positions already mentioned hereinabove; thus to transmit the driving power of the input shaft (1) to the output shaft (2), reducing the speed and reversing the rotation via the idle gear (13), by sliding the second speed-shifter (11) into the said third position thereof.

The said power-take-off line change-speed gearing apparatus (Aa) is constructed with: a first helical gear (4A) and a second helical gear (4A') both loosely fitted on an output shaft (2A) (referred to hereinafter as a "second output shaft," while aforementioned running-travel-system output shaft (2) is referred to as a "first output shaft," in order to distinguish these two output shafts) extending parallel with the said input shaft (1), as engageable in meshing interconnection with the said helical gear (3) for high speed transmission of the input shaft (1) and with a helical gear (3') for low speed transmission as securely fixed to the input shaft (1), respectively, in a state fixed in the axial direction at such respective positions that may always retain the respective meshing engagements; and a third speed-shifter (8A) having a spur gear (6A) engageable in meshing interconnection with the said spur gear (5) for medium speed transmisson of the input shaft (1), a first engagement lug (7A) engageable in secure interconnection with the first helical gear (4A) and a second engagement lug (7A') engageable in secure interconnection with the second helical gear (4A'), as splined on the said second output shaft (2A) for free sliding only in the axial direction with its position shiftable over a position for bringing only the spur gear (6A) in the meshing interconnection, another position for bringing only the first engagement lug (7A) in the secure interconnection, still another position for bringing only the second engagement lug (7A') in the secure interconnection and yet another position for bringing them all off their interconnection.

Thus, construction is provided to realize by sliding the third speed shifter (8A) the three change-speed transmission states just as in the said running-travel-system change-speed gearing apparatus (A), here the transmission from the input shaft (1) to the second output shaft (2A) being operated by means of the third speed-shifter (8A) in any of the change-speed transmission states.

Looking further hereinto, spline shaft portions (15), (15A) of the said two output shafts (2),(2A), respectively, for fitting into the speed-shifters (8),(11) and (8A), are constructed to be of larger diameters than loose-fitting shaft portions (16) and 16A),(16A') for loosely fitting the helical gears (4) and (4A),(4A'); the secure interconnection portions (7) and (7A),(7A') of the speed-shifters (8) and (8A), respectively, are constructed as internal or female spline portions thereof and mating outer or male spline portions (18) and (18A),(18A'), just the same as the said spline shaft portions (15) and (15A), respectively, are formed integrally with the bosses (17) and (17A),(17A') of the helical gears (4) and (4A),(A'), respectively, so that the said respective internal spline portions (7) and (7A),(7A') may be brought into secure spline engagement therewith and may be released of such engagement.

The said Harrison-type planetary gearing reduction apparatus (B) is constructed with: a carrier (20) splined on the said first output shaft (2); a planetary gear (21) journaled on the carrier (20) for free rotation relative thereto; an intermediary transmission shaft (22) with one end thereof journaled on one end of the said first output shaft (2) to be freely rotatable relative thereto and with the other end thereof journaled on a transmission case portion for free rotation; a gear (23) formed integrally with that shaft (22) to be in engagement with the planetary gear (21); a sleeve shaft (24) having a gear (25) of the tooth number slightly less than the said gear (23) meshing with the planetary gear (21), as loosely fitted on the said intermediary transmission shaft (22); and a clutch-shifter (26) splined on that sleeve shaft (24) for shifting between two modes, namely either to lock up the sleeve shaft (24) as is secured to the transmission case thus for making full play of the speed-super-reducing function of the Harrison-type planetary gearing or to lock it up as is secured to the said carrier (20) thus for killing up or making ineffective the speed-super-reducing function. Designated at (27) is a speed-reduction shaft disposed beneath the said intermediary transmission shaft (22), and a larger-diameter reduction gear (28) is provided thereon to be rotatable integrally therewith. This reduction gear (28) is always in mesh with a smaller diameter gear (29) splined on the said intermediary transmission shaft (22). With respect hereto, the said auxiliary change-speed gearing apparatus (C) is constructed with: a larger gear (30) and a smaller gear (31), fitted on the said speed-reduction shaft (27); and a bevel pinion shaft (34) fitted with a smaller gear (32) and a larger gear (33) splined thereon to be alternatively engageable with the mating gears (30) and (31), respectively. From this bevel pinion shaft (34), power is transmitted to the said differential (D). The said larger-diameter reduction gear (28) has no function of shifting in various steps the rotation obtained from the planetary gearing reduction apparatus (B) it having rather the simple function of transmitting the rotation to the said auxiliary change-speed gearing apparatus (C) under a constant speed reduction ratio.

We claim:
1. A multi-stage change-speed apparatus for a tractor, comprising:
a main running-travel-system change-speed gearing apparatus (A) including an input shaft (1) and a first output shaft (2) disposed above said input shaft (1),
an intermediary transmission shaft (22) in axial alignment with said first output shaft (2),
a planetary gearing reduction apparatus (B) disposed between said first output shaft (2) and said intermediary transmission shaft (22) shiftable between super-reduction of speed from said first output shaft to said intermediary transmission shaft and for transmission without such reduction of speed,
a bevel pinion shaft (34) disposed below said intermediary transmission shaft (22),
a differential (D) operatively connected to said bevel pinion shaft (34), and
a power takeoff line change-speed gearing apparatus (Aa) including said input shaft (1) and a second output shaft (2A) disposed below said input shaft (1) in axial alignment with said bevel pinion shaft (34), characterized in that
said main running-travel-system change-speed gearing apparatus (A) includes a helical gear (3) for high speed transmission and a spur gear (5) both securely fixed to said input shaft (1), a second helical gear (4) loosely fitted on said first output shaft (2), in constant engagement with said helical gear (3) and a first speed shifter (8) including a spur gear (6) engageable with said spur gear (5) and an engagement lug (7) fitted on a spline shaft portion (15) of said first output shaft (2), said first speed shifter (8) being slidable to cause the engagement lug (7) to fit on a spline portion (18) of said second helical gear (4),
said spline portion (18) of said second helical gear (4) has an identical shape with said spline shaft portion (15) of said first output shaft (2),
said power takeoff line change-speed gearing apparatus (Aa) including said helical gear (3) for high speed transmission, said spur gear (5), a third helical gear (4A) loosely fitted on said second output shaft (2A), in constant engagement with said helical gear (3) and a third speed shifter (8A) including a spur gear (6A) engageable with said spur gear (5) and an engagement lug (7A) fitted on a spline shaft portion (15A) of said second output shaft (2A), said thid shifter (8A) being slidable to cause the engagement lug (7A) of said third shifter (8A) to fit also on a spline portion (18A) of said third helical gear (4A),
said spline portion (18A) of said third helical gear (4A) has an identical shape with spline shaft portion (15A) of second output shaft (2A),
a speed-reduction shaft (27) disposed below said intermediary transmission shaft (22) and above said bevel pinion shaft (34), said speed-reduction shaft (27) car- rying a large gear (28) in engagement with a small gear (29) mounted on said intermediary transmission shaft (22), an auxiliary change-speed gearing apparatus (C) being disposed between said speed-reduction shaft (27) and said bevel pinion shaft (34), and a transmission shaft (E) operatively connected to said second output shaft (2A) is disposed below bevel pinion shaft (34), and is also operatively connected to a power takeoff shaft F via a reduction gearing mechanism G.

2. The apparatus of claim 1, wherein the said auxiliary change-speed gearing apparatus (C) comprises:
a larger gear (30) and a smaller gear (31), fitted on the said speed-reduction shaft (27), and
a smaller gear (32) and a larger gear (33), fitted on the said bevel pinion shaft (34) to be alternatively engageable with the mating gears (30) and (31), respectively.

3. The apparatus of claim 2, wherein the said running-travel-system change-speed apparatus (A) is constructed for changing speed in forward three steps and rearward one step.

* * * * *